Figure 1:
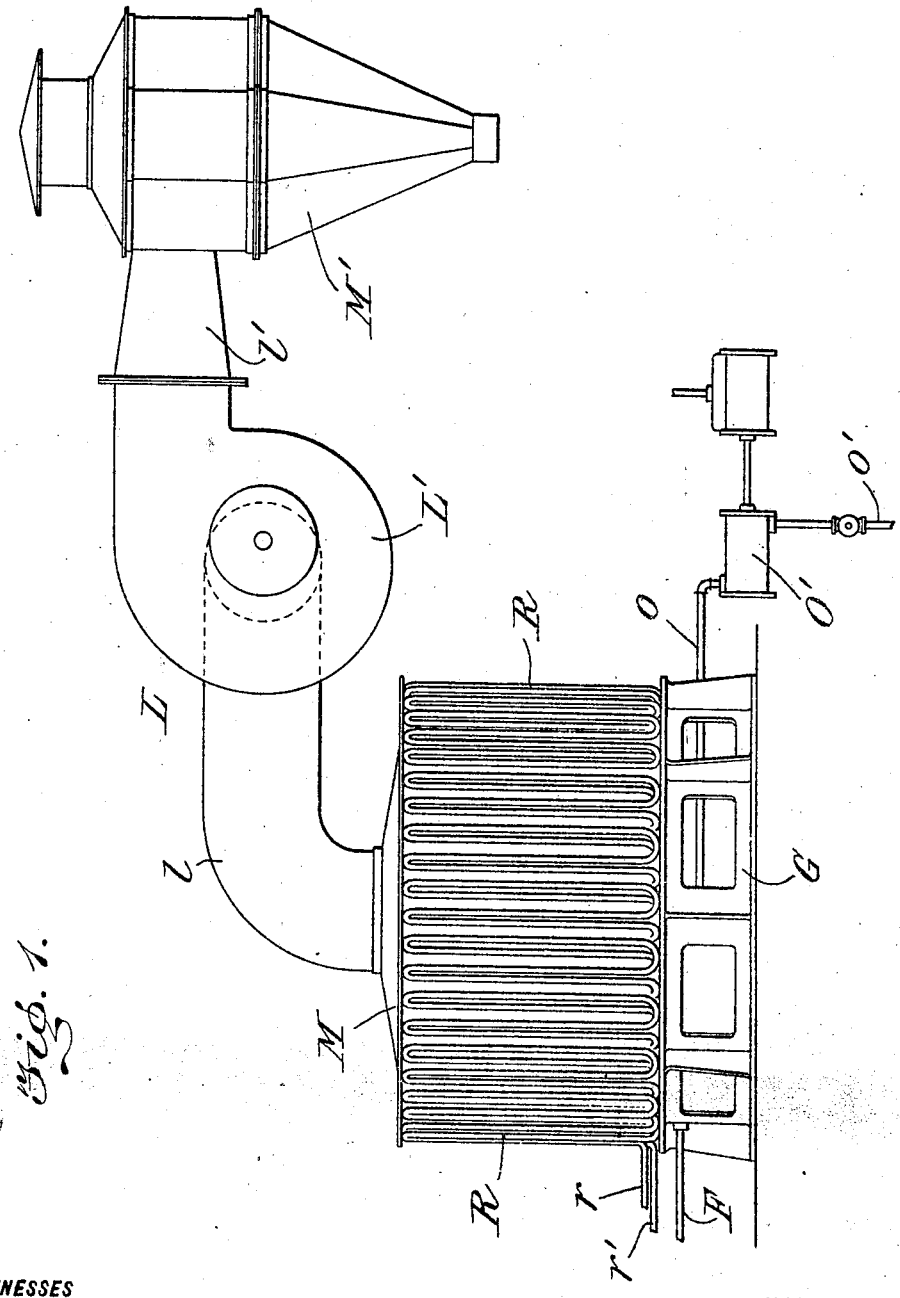

W. S. OSBORNE.
DEHYDRATING APPARATUS.
APPLICATION FILED FEB. 24, 1909.

1,007,382.

Patented Oct. 31, 1911.
4 SHEETS—SHEET 1.

WITNESSES

INVENTOR
William S. Osborne
BY
ATTORNEYS

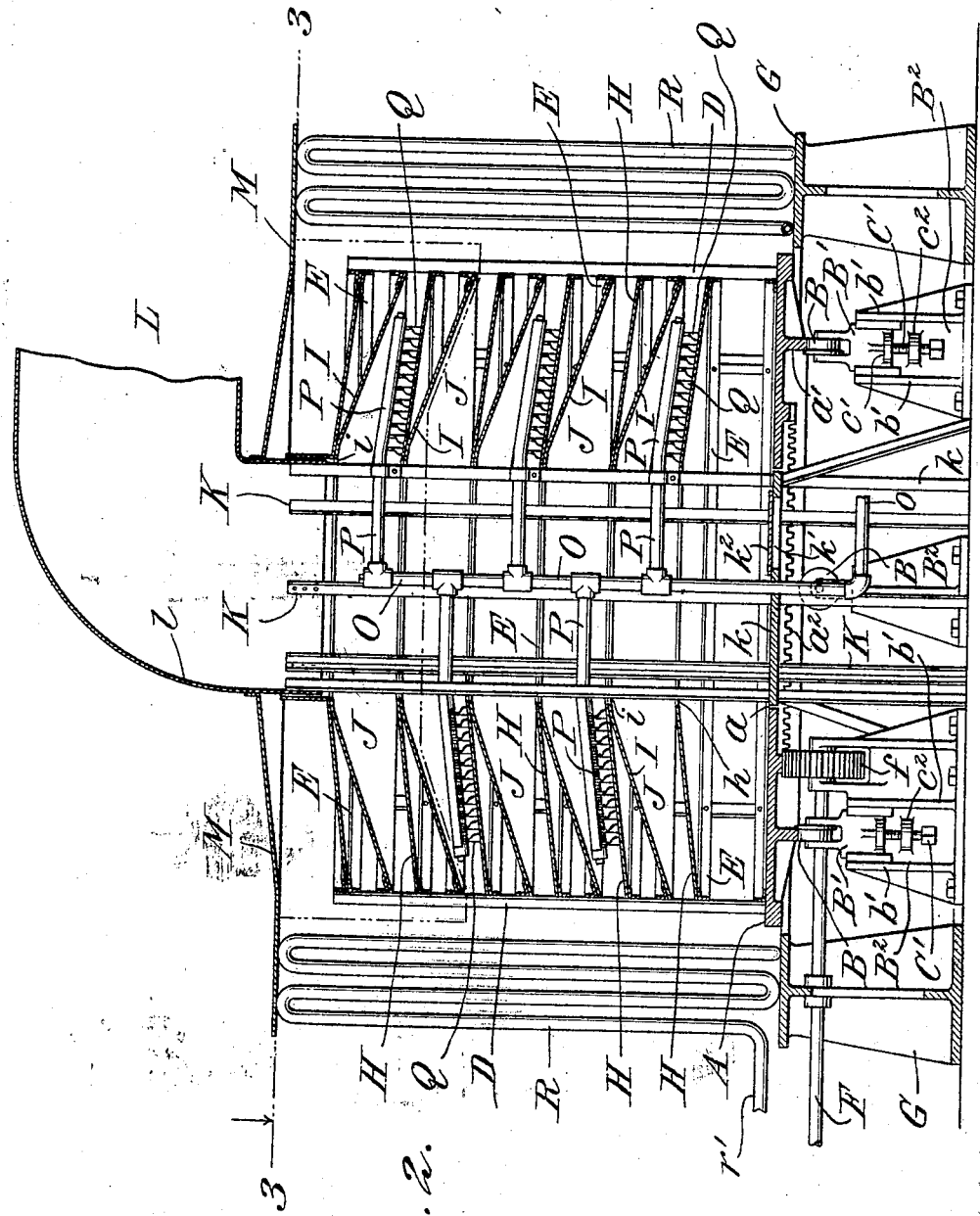

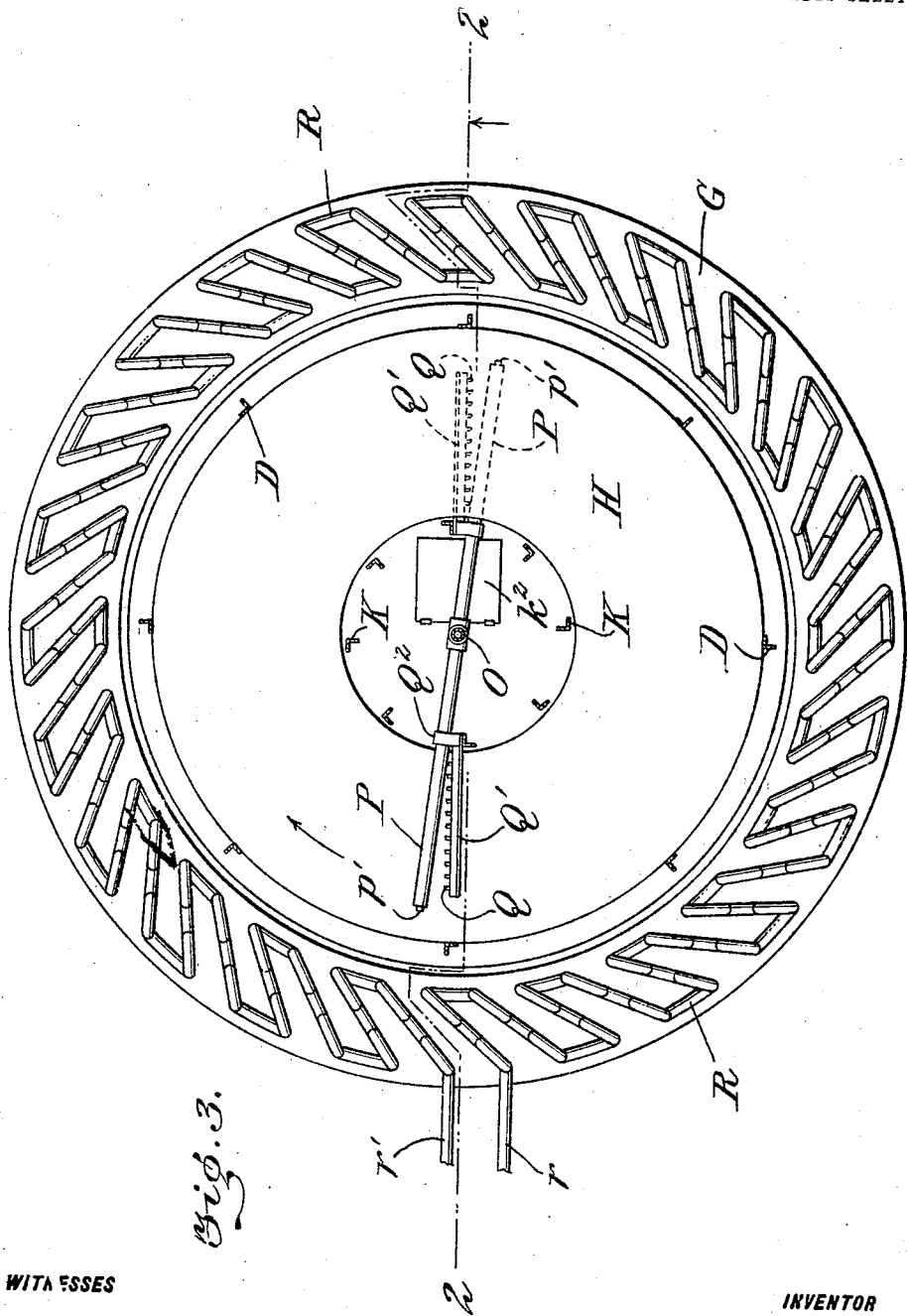

W. S. OSBORNE.
DEHYDRATING APPARATUS.
APPLICATION FILED FEB. 24, 1909.
1,007,382.
Patented Oct. 31, 1911.
4 SHEETS—SHEET 4.
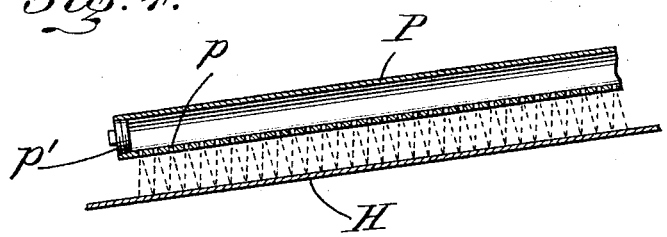
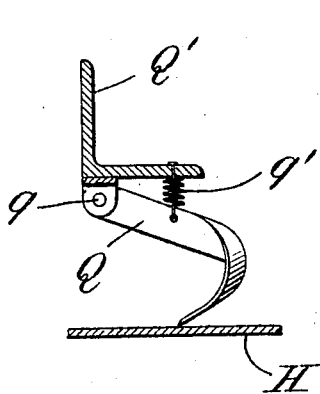
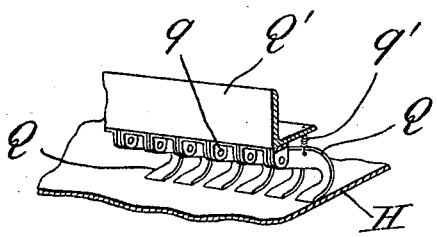
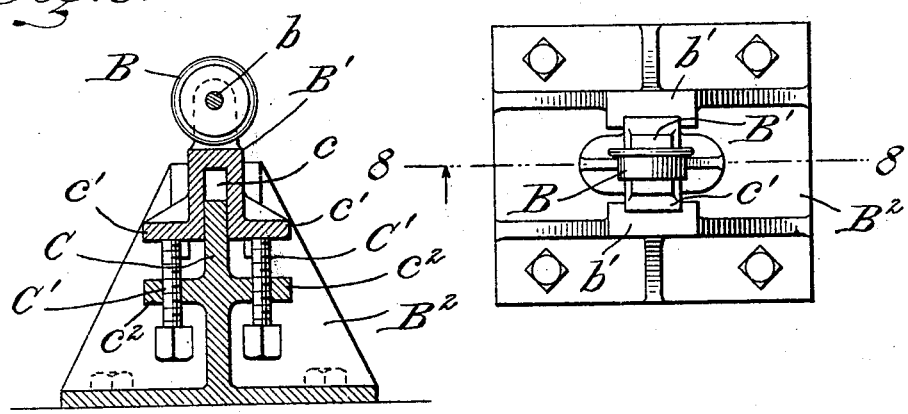
WITNESSES
INVENTOR
William S. Osborne
BY
ATTORNEYS

UNITED STATES PATENT OFFICE.

WILLIAM SILAS OSBORNE, OF NEW YORK, N. Y., ASSIGNOR, BY DIRECT AND MESNE ASSIGNMENTS, TO OSBORNE DESICCATING MACHINERY COMPANY, A CORPORATION OF NEW YORK.

DEHYDRATING APPARATUS.

1,007,382.      Specification of Letters Patent.     Patented Oct. 31, 1911.

Application filed February 24, 1909. Serial No. 479,820.

*To all whom it may concern:*

Be it known that I, WILLIAM S. OSBORNE, a citizen of the United States, residing in the city of New York, borough of Manhattan, county and State of New York, have invented a certain new and useful Dehydrating Apparatus, of which the following is a specification.

This invention is a dehydrating or desiccating apparatus adapted to concentrate or dry liquid substances, and, more particularly, for producing milk powder.

It is well recognized that the constituents of milk, particularly the albuminoids, are very susceptible to changes if heated for too long a time or at too high a temperature, and the object of the present invention is to remove the liquid from the milk in such manner that the solid constituents retain substantially their normal characteristics as to taste, solubility, etc.

In the present invention, the milk, or other liquid substance to be treated, is spread out into films and brought into contact with a large volume of warm air, whereby it is thoroughly and expeditiously dehydrated.

In a preferred form of the invention, the milk, or other liquid, is distributed in a thin layer over each of a series of rotatable tables, and coöperating with each table is a scraper for loosening the film of dried milk therefrom. Exteriorly of the tables are provided means, such as steam coils, for heating the air which is drawn over the surface of the milk and by which the dehydration is effected.

I have found it advantageous to incline the tables downwardly and outwardly for the purpose of assisting the distribution of the milk thereover, and to provide a wall or baffle above each table, and inclined with reference to the table, so that an air chamber or space is formed having a considerably larger area at its outlet than at its inlet, whereby the speed of the air through the chamber is kept substantially uniform, and thereby enabling the milk on all parts of the table to be evaporated under substantially the same conditions.

In the accompanying drawings I have illustrated one practical embodiment of the invention, but the construction shown therein is to be understood as illustrative only, and not as defining the limits of the invention.

Figure 1 is a side elevation of my new dehydrating apparatus. Fig. 2 is a vertical section on the line 2—2 of Fig. 3. Fig. 3 is a sectional plan view, the plane of the section being on line 3—3 of Fig. 2. Fig. 4 is a detail showing one of the distributing pipes adapted to flow the liquid to be treated upon the table. Fig. 5 is a detail perspective of a portion of one of the scraping devices. Fig. 6 is a vertical cross section through said scraping device. Fig. 7 is a plan view of one of the adjustable supports for the rotating table. Fig. 8 is a cross section on the line 8—8 of Fig. 7.

A designates a rotatable platform, preferably in the form of a broad flat ring having a central opening, $a$. Said platform is supported in a horizontal position on rollers, B, and for this purpose the rollers are flanged, as shown in Fig. 1, and adapted for engagement with an annular depending flange, $a'$, of the platform. The supporting rollers, B, are each mounted on a horizontal axle, $b$, carried in the upper part of a vertical adjustable slide, B', the latter being fitted for movement in parallel guides, $b'$, of a stand, B². The slide is provided, also, with a central opening, $c$, which receives a guide member, C, whereby the slide is guided at its edges and central portion for adjustment in a vertical direction within said stand, B². The bottom portion of slide, B', is provided with flanges, $c'$, with which engage adjusting screws, C', having bearings in a flange, $c^2$, of the stand, B², all as shown clearly in Figs. 1, 7 and 8. A proper number of the stands and rollers are provided below the rotary platform for supporting the latter in operative position, and the rollers are adjustable separately by proper manipulation of the screws, C', whereby the table is supported for rotation freely in a horizontal plane. Upon said rotary platform is erected an upright skeleton frame, shown in Figs. 2 and 3 of the drawings as consisting of vertical columns, D, preferably in the form of angle irons, and horizontal rings, E, the latter being, also composed of angle irons. Columns, D, are secured firmly to rotary platform, A, preferably near the outer edge thereof, and to said columns are fastened the rings, E, thereby producing a light but substantial skeleton structure or frame work, the latter being adapted to support the rotating devices.

Suitable means are provided for positively driving the rotary platform and the devices thereon, but, as shown in Fig. 2, said platform is provided on its underside with an annular toothed flange $a^2$, forming a gear or rack with which engages the spur gear pinion, $f$, carried by a horizontal driving shaft, F, the latter being journaled in suitable bearings on a base, G, below the horizontal plane of said platform, A. The shaft may be driven by a motor, engine or other source of power.

H designates a series of tables superposed one upon the other and positioned within the skeleton frame work, D, E, on the rotary platform. Each table is in the form of an annular plate secured at its edge portion to one of the rings, E, of said skeleton frame. Each table is provided with a central opening, $h$, and the tables are so positioned that the openings, $h$, thereof are in alinement vertically with each other and with the central openings, $a$, of the rotary platform, A, see Fig. 2. Tables, H, may consist of a single plate, or they may be of sectional construction. Furthermore, each table may occupy a horizontal position, but for the purpose of flowing the liquid uniformly over the table, it is preferred to make each table slightly conical, whereby the table inclines downwardly and outwardly from the central openings, $h$, toward ring, E.

Tables, H, are spaced equidistantly within the skeleton frame on rotary platform, A, and intermediate two adjoining tables is a baffle or plate, I, a series of said baffles or plates being employed in the apparatus, and one of said baffles or plates being positioned over each table, H. The baffles or plates are provided with central openings, $i$, and said baffles are secured at their edges to certain rings, E, of the skeleton frame, whereby the baffles are positioned within and supported by the skeleton frame, and the central openings, $i$, of said baffles are in alinement with openings, $h$, and $a$, of tables, H, and platform, A, respectively. Each baffle, I, is substantially conical, but the angle of inclination of the baffle with respect to the table with which it is associated is slightly greater than the angle of inclination of said table, as shown in Fig. 1. Each baffle is placed over one table for the purpose of producing an air chamber, J, between the under-surface of the baffle and the top surface of table, and this chamber has an inlet opening at its outer edge, next to the columns, D, and an outlet opening at its inner edge next to the openings, $i$. The chamber is of less cross sectional area at its inlet opening, next to the outer edges of table, H, and baffle, I, and this chamber gradually increases in cross sectional area from said inlet opening toward its outlet opening, whereby the speed of the air drawn into the chamber is practically uniform over the entire area of table, H, as will hereinafter appear.

Extending upwardly through the central openings, $a$, $h$, $i$, of platform, A, tables, H, and baffles, I, respectively, are a series of columns, K, fixed at their lower ends in any suitable way, and supported on these columns is a platform, $k$, the latter being positioned within opening, $a$, substantially in the horizontal plane of rotary platform, A. Said fixed platform is provided with a manhole, $k'$, which is normally closed by a trap door, $k^2$, thus providing means whereby an operator may gain access to the central interior portion of the apparatus. Vertical columns, K, extend upwardly to the top portion of the apparatus, and they serve primarily as the means for supporting one branch, $l$, of a wind trunk, L, and the roof or cover, M, of the apparatus. As shown, branch, $l$, of the wind trunk is fastened directly to the upper ends of columns, K, and roof or cover, M, is attached to said wind trunk branch, but this detailed construction may be modified. The branch, $l$, is connected with an exhaust fan or blower, L′, and the outgoing branch, $l'$, of said wind trunk is connected with a dust collector or centrifugal machine, M′, the latter being constructed in accordance with certain prior patents heretofore granted to me, for the purpose of separating the desiccated product secured by this invention, and collecting said product in suitable receptacles.

O designates a stand pipe which is supported in a vertical position centrally within columns, K, and to the lower part of this stand pipe is connected a feed pipe, $o$, through which the liquid substance to be operated upon is forced by the action of a pump, O′, said liquid substance being supplied to the pump by a valved pipe, $o'$, see Fig. 1.

Extending from stand pipe, O, is a series of branch distributing pipes, P, the latter being attached at proper intervals in a suitable way to said stand pipe, and extending radially therefrom over tables, H. Each distributing pipe is, preferably, inclined for a part of its length, so as to lie parallel, or substantially so, to one of the tables, as in Figs. 2 and 4, and preferably each pipe is provided in its underside with a series of distributing openings, $p$, the outer or free end of said pipe being closed by a plug or head, $p'$. It is evident that the liquid material to be treated is supplied by pipe, $o$, and pump, O′, to stand pipe, O, and from the stand pipe said material is distributed by a number of branch pipes, P, which operate in conjunction with the several rotary tables, H, so as to uniformly distribute the material over and upon said tables, whereby the liquid material is flowed in a thin uniform layer upon each of said rotary tables.

The liquid material distributed in the manner described upon the rotary tables is adapted to be evaporated or dried by the circulation of air over the tables, between the latter and baffles, I, and after the material shall have been dried, it is removed by the action of certain mechanical devices from the tables. One means for removing the desiccated material is shown in Figs. 2, 3, 5 and 6 of the drawings, wherein mechanical scrapers are employed. The scrapers, Q, are shown in the form of rakes each pivoted at its upper end, as at $q$, to a carrying member, Q', the latter being in the form of an angle bar which is attached by a clamp, $Q^2$, to one of the radial distributing pipes, P: Scrapers, Q, are held individually under the tension of springs, $q'$, attached to carrying member, Q', and to the scrapers, as shown in Fig. 6. A series of scrapers is supported by each carrying member, Q', and said scrapers coöperate with one rotary table, H, whereby the scrapers are adapted to remove the desiccated material which adheres to the upper surface of said rotary table. Scrapers of each series are pressed by the springs into yielding contact with each of said tables, and by pivoting the scrapers and holding them under spring pressure, said scrapers are adapted to yield in order to conform to any inequalities in the surface of the table.

The supporting member, Q', and the series of scrapers thereon, are positioned at one side of each radial distributing pipe, P, as shown in Fig. 3, and the arrangement of said distributing pipes and the scrapers is such that the liquid material flowed upon the table by pipe, P, is carried away from the scrapers, said table rotating in the direction indicated by the arrow in Fig. 3, whereby the freshly flowed material travels away from the scrapers, and said scrapers are adapted to act upon the dried or desiccated material, thus exposing the material to the drying action of the air, before said material is subjected to the action of the scrapers. The process is a continuous one, for the reason that the liquid material is supplied continuously by pipes, P, to the series of tables, said material is dried on the tables by the air currents flowing over them, the dried material is removed in the form of flakes or powder from the tables by the scrapers, and the desiccated material thus released from the tables is carried off by the air current, whereby the material is subjected to the action of the air current during the desiccating operation proper, and the removed material is, furthermore, subjected to the drying action of the air while said material passes through the wind trunk and into collector, M'.

Base, G, of the apparatus supports heating coils, R, the latter being of the form shown more clearly in Figs. 1, 2 and 3 of the drawings. Said coils extend vertically between base, G, and cover, M, and they extend in zigzag paths across the base, as shown in Fig. 3. Said heating coils are positioned exteriorly to the rotary tables, and said coils are of such capacity as to provide very large areas of heating surface, whereby the air drawn into the apparatus by fan or blower, L', is heated to the desired temperature by contact with coils, R, before the air is brought into contact with the liquid material on tables, H. It is preferred to supply live steam, by a pipe, $r$, to one end of the coils, and to the other end of said coils is connected a return pipe, $r'$, which operates to carry off the exhaust steam and the water of condensation.

The operation will be apparent from the preceding description taken in connection with the drawings, but it may be referred to briefly as follows. Pump, O', forces the material through stand pipe, O, and said material is distributed by pipes, P, upon tables, H, the material being supplied in a thin uniform layer upon each table. Shaft, F, is driven by an engine, or otherwise, for the purpose of rotating platform, A, and this platform carries with it the skeleton frame, tables, H, and baffles, I, said tables rotating with respect to distributing pipes, P, and scrapers, Q. Steam is supplied to the heating coils, R, and fan or blower, L', is operated, whereby air is drawn through the coils and in all directions around tables, H, the air flowing inwardly through chambers, J, and upwardly through openings, $h$, $i$, of the tables and the baffles so that the air is drawn through the wind trunk and the fan for delivery into the collecting and separating apparatus, M'. The air flows over the fluid material deposited in the form of thin films upon tables, H, and by reason of the peculiar relation of baffles, I, to said tables, H, the speed of the air is uniform over the entire surface of each table. During the rotation of the tables, scrapers, Q, act to mechanically remove the desiccated filmy material from the tables, and the air circulating through chambers, J, not only evaporates the moisture from the liquid material, but it, also, picks up and carries with it the desiccated material, whereby the residual moisture in the desiccated material is evaporated during the transit of said material from the desiccating apparatus to the collecting and separating apparatus.

With respect to the flow of the air current over each table, H, importance is attached to the employment of baffles, such as I, in connection with tables, H. As heretofore described, each baffle is substantially conical, and the inclination of said baffle is different from the inclination of the table, for the purpose of producing a chamber, J, the cross sectional area of which is greatest at the inner edges of the table and the baffle. Now, when fan, L', is in operation, air is drawn through coils, R, and the relatively narrow annular inlet openings at the outer edges of chambers, J. The air in passing through the chambers, and over the tables, expands in volume, and owing to such expansion, the speed of the air, as it flows toward the fan is not increased, whereby the thin layer of material on the table is exposed to the drying action of the air uniformly throughout the area of each table.

Having thus fully described the invention, what I claim as new, and desire to secure by Letters Patent is:

1. In a dehydrating apparatus, a desiccating chamber, a series of rotary tables positioned one above the other, means for distributing liquid material to be operated upon in thin layers over said tables, scrapers coöperating with said tables, and means positioned centrally with respect to the tables for securing the circulation of an air blast over each of the tables, and in contact with the thin layers of material thereon.

2. In a dehydrating apparatus, a desiccating chamber, a series of rotatable tables positioned one above the other, means uniting said tables for effecting rotation thereof simultaneously, means for distributing liquid material to be operated upon in thin layers over said tables, scrapers coöperating with said tables, and means positioned centrally with respect to the tables, for securing the circulation of an air blast between said tables and in contact with the layers of material thereon.

3. In a dehydrating apparatus, a desiccating chamber, a series of tables positioned one above the other, said tables being inclined from their inner edges outwardly and downwardly, a stand pipe provided with distributing pipes positioned over the tables for supplying liquid material upon said tables, scrapers coöperating with said tables, and means for effecting the circulation of an air blast over said tables and in contact with the liquid material thereon.

4. In a dehydrating apparatus, a desiccating chamber, a series of tables positioned one above the other, means for distributing liquid material upon said tables, means for circulating an air blast over the tables and in contact with the material thereon, means for freeing the films of desiccated material from the surfaces of said tables, and means for producing a relative movement of the tables with reference to the liquid distributing means and the film removing means.

5. In a dehydrating apparatus, a series of tables positioned one above the other, means for distributing the liquid operated upon in thin layers over said tables, walls or baffles above said tables and inclined with relation thereto, thereby forming a plurality of chambers, the inner opening of each chamber being of greater area than the outer opening, scrapers coöperating with the tables, and an exhaust flue communicating with the inner larger openings of said chambers, whereby an air blast is caused to circulate over the tables, from the outer edges thereof, inwardly toward the suction flue.

6. In a dehydrating apparatus, a desiccating chamber, a series of rotary tables positioned one above the other, said tables having air inlet spaces between their outer edges, means for causing blasts of air to enter the air spaces at the outer edges of the tables and to flow inwardly over the tables and in contact with the material thereon, means exterior to the tables for heating the air prior to its admission into said spaces between the tables, and scrapers for removing the material from said tables.

7. In a dehydrating apparatus, a desiccating chamber, a table, means for distributing liquid material upon said table, scrapers for removing desiccated material from said table, a baffle inclined with respect to the table for producing in connection therewith an air chamber which increases in cross sectional area inwardly from the outer edge of said table, and means for producing a circulation of air through said chamber.

8. In a dehydrating apparatus, a desiccating chamber, a rotary table positioned therein, means for distributing liquid material upon said table, a baffle inclined with respect to the table for producing in connection therewith an air chamber which increases in cross sectional area inwardly from the outer edge of said table, means for mechanically removing the desiccated material from said table, and means for exhausting air from the desiccating chamber.

9. In a dehydrating apparatus, a desiccating chamber, a rotary table positioned therein, means for distributing liquid material upon said table, a baffle inclined with respect to the table for producing in connection therewith an air chamber which increases in cross sectional area inwardly with respect to the table, means for removing desiccated material from said table, and means for exhausting air from the desiccating chamber, whereby air is caused to flow over said table and from the outer edge of said table inwardly thereof.

10. In a dehydrating apparatus, a rotatable table, means for distributing liquid material upon said table, a baffle inclined with respect to said table, means for causing an air blast to flow over the table and below the baffle, and scraping mechanism so positioned with respect to the liquid distributing means as to operate upon desiccated material on said rotatable table.

11. In a dehydrating apparatus, a desiccating chamber the walls of which are composed of heating coils adapted for heating air to be supplied to the chamber, means for supplying to the desiccating chamber the liquid material to be treated, and an air exhauster connected to the upper central part of the chamber for producing an upward flow of a blast of air through the desiccating chamber, whereby the heated air supplied by the coils acts to desiccate the material supplied to the chamber and to carry off the resulting desiccated product.

12. In a dehydrating apparatus, a desiccating chamber, a series of rotary tables positioned within said chamber and one above the other, a central stand pipe for supplying liquid material, a series of distributing pipes connected to the stand pipe and each positioned over one of said tables, means for exhausting air from said chamber whereby an air blast circulates over each of said tables, and means for releasing the desiccating material from adhering to the surfaces of the tables.

13. In a dehydrating apparatus, a desiccating chamber the exterior wall of which is composed of air heating coils, rotary tables positioned one above the other and within said chamber, means for supplying liquid material upon the upper surface of each table, an air exhauster connected to the desiccating chamber for producing the flow of air through the coils and securing an air blast over each of said tables, and means for releasing the desiccated material from adhering to said tables.

14. In a dehydrating apparatus, a rotatable platform, a plurality of tables carried thereby, means for circulating air over and in contact with said tables, a stand pipe rising centrally through the tables, branch pipes positioned over the respective tables for distributing liquid material from the stand pipe upon said tables, and means for scraping desiccated material from said tables.

15. In a dehydrating apparatus, a rotatable platform, a plurality of tables carried thereby, a stand pipe, distributing pipes positioned over each of said tables for distributing liquid material over and upon said tables, baffles intermediate the tables and inclined with respect thereto, means for circulating air through the spaces between the tables and the baffles, and means for heating the air.

16. In a dehydrating apparatus, a desiccating chamber one of the walls of which is composed of heating coils spaced to produce air inlets for the free inflow of atmospheric air, means for supplying and distributing liquid material within said chamber, and an air exhauster connected to the desiccating chamber to produce a flow of heated air inwardly through the air inlets of the heating coils and upwardly through said desiccating chamber, the upwardly flowing current of air operating to carry off the desiccated material from said chamber.

17. In a dehydrating apparatus, a desiccating chamber the inclosing wall of which is composed of heating coils arranged to produce numerous vertical openings for the free inflow of atmospheric air into said chamber, means for supplying liquid material to and distributing the same within said desiccating chamber, and an air exhauster connected to the upper central part of said desiccating chamber for producing a flow of heated air through said vertical openings of the heating coils, the air so admitted flowing inwardly with respect to the chamber, and upwardly therethrough, whereby the ascending current of air carries off the desiccated material from the upper part of the chamber.

In testimony whereof I have signed my name to this specification in the presence of two subscribing witnesses.

WILLIAM SILAS OSBORNE.

Witnesses:
H. T. BERNHARD,
M. C. POWELL.